United States Patent [19]

Drejza

[11] Patent Number: 4,475,831

[45] Date of Patent: Oct. 9, 1984

[54] POSITION TRACKING EMITTER FOR A PRINTER WITH EMITTER PATTERN ON LEAD SCREW

[75] Inventor: John E. Drejza, Charlotte, N.C.

[73] Assignee: International Business Machines Corporation, Armonk, N.Y.

[21] Appl. No.: 522,953

[22] Filed: Aug. 12, 1983

[51] Int. Cl.[3] .......................... B41J 21/16; G01D 15/24

[52] U.S. Cl. .......................... 400/279; 400/328; 346/139 D

[58] Field of Search .......................... 400/279, 328, 124; 346/139 D

[56] References Cited

U.S. PATENT DOCUMENTS

| | | | |
|---|---|---|---|
| 3,518,699 | 6/1970 | Mitchell | 346/139 D X |
| 3,523,160 | 8/1970 | Willey | 101/DIG. 13 |
| 4,169,685 | 10/1979 | Gruber | 400/279 |
| 4,247,214 | 1/1981 | Swan, Jr. | 346/139 D |
| 4,343,012 | 8/1982 | Knapp | 400/279 |

*Primary Examiner*—E. H. Eickholt
*Attorney, Agent, or Firm*—E. Ronald Coffman

[57] ABSTRACT

An emiter marking pattern is provided on a lead screw in parallel with the thread of the lead screw. A carriage driven along by the lead screw contains a transducer for sensing the emitter marking pattern on the lead screw to produce electrical output signal pulses indicative of incremental displacement of the carriage. A printhead can be mounted on the carriage and the electrical output signal pulses from the transducer used to control printing operations. The emitter marking pattern can be designed to provide control signals for other purposes, for example for controlling start-up, running, deceleration and reversal of a motor driving the lead screw.

9 Claims, 3 Drawing Figures

POSITION TRACKING EMITTER FOR A PRINTER WITH EMITTER PATTERN ON LEAD SCREW

DESCRIPTION

1. Technical Field

The present invention relates generally to position tracking pulse emitters and more particularly to emitters for providing a digital electrical output signal representing the position or displacement of a linearly movable carriage such as that used to move the print head of a serial printer.

2. Background Art

Two general types of position tracking emitters are known. The first type is linear as shown, for example, in U.S. Pat. No. 3,533,703 to S. A. Wingate. That patent discloses a position or displacement encoder plate extending along the path of a carriage whose position is to be monitored. The plate has evenly spaced light transmitting and light blocking portions. The carriage contains a light source on one side of the plate and photocells on the other side of the plate. Displacement of the carriage relative to the plate causes the photocells to produce electrical pulses. The encoder plate is separate from, and in addition to the carriage device mechanism and requires separate assembly and alignment. Also the light transmitting and blocking portion must be very small and require expensive techniques to be sensed accurately.

The second known type of emitter is rotary as shown, for example, in U.S. Pat. No. 3,898,671 to J. M. Berry. In that patent, the linear displacement of a printhead carriage, as it is driven by a lead screw, is indirectly tracked by sensing the rotary displacement of the lead screw through use of an emitter disc mounted on one end of the lead screw. Peripheral markings on the disk are sensed to produce electrical output pulses from which the actual linear position or displacement of the carriage can be computed. Computational logic and homing operations would be required to relate the angular position of the lead screw to the linear position of the carriage.

Disclosure of the Invention

The present invention makes possible the provision of a position tracking emitter which is made integral with a carriage driven lead screw and follower. This emitter requires no separate assembly and adjustment. The emitter of this invention provides the position indicative marks directly on the leadscrew and disposes the transducer in the carriage so that the only action required to provide the necessary co-operation of the transducer and the encoding marks is to mount the carriage on the lead screw.

More specifically, in accordance with the invention, a lead screw is provided with a coding mark pattern disposed along a track parallel to the lead screw thread. Transducer means is mounted in a carriage engaged by the thread whereby displacement of the carriage caused by rotation of the lead screw results in the production by the transducer of electrical signals indicative of the motion of the carriage. Since the marks are uniquely related to linear carriage positions, position measurement is direct. The position markings can be at a much greater spacing than those on a linear emitter of equal resolution since the position markings are distributed along the greater length of a helix.

For purposes of illustration, the emitter of my invention will be described in connection with a serial wire matrix printer; however, the emitter can be used in other types of printers and indeed in other types of machines such as robot manipulators and head drives in magnetic disk files. An example of a serial wire matrix printer is disclosed in U.S. Pat. No. 3,592,311 to A. S. Chou et al., and assigned to International Business Machines Corporation.

Figure 1:
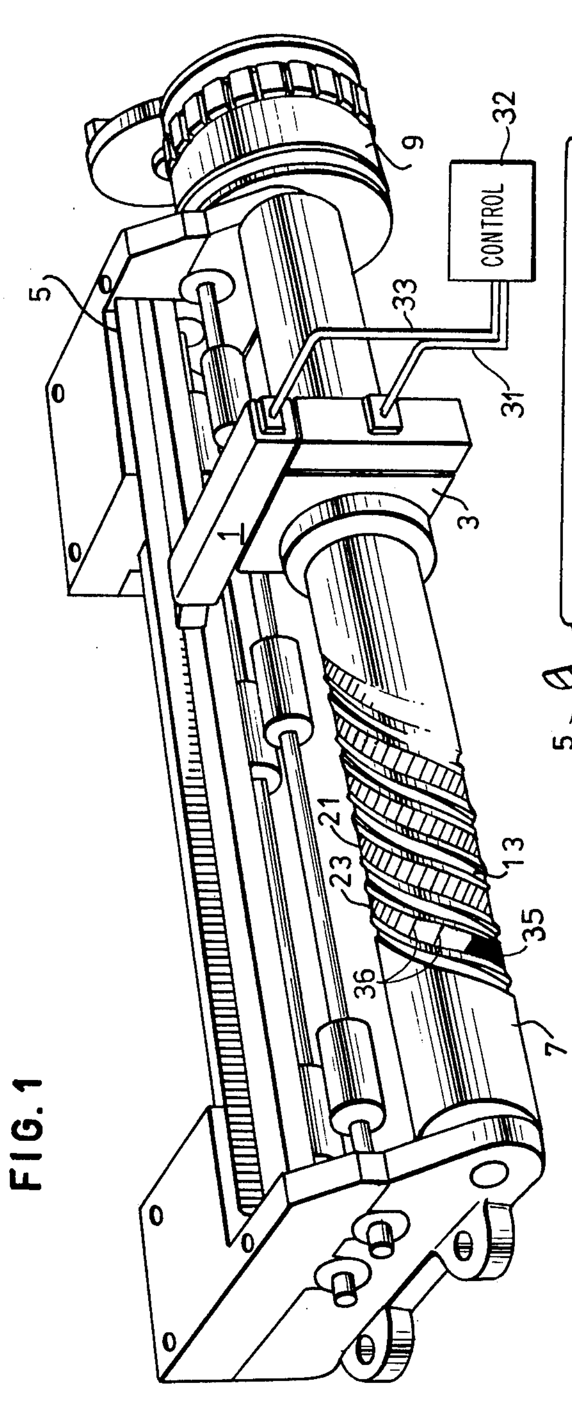
FIG. 1 is a diagrammatic perspective view of a wire matrix printer incorporating a position tracking emitter according to the invention.
Figure 2:
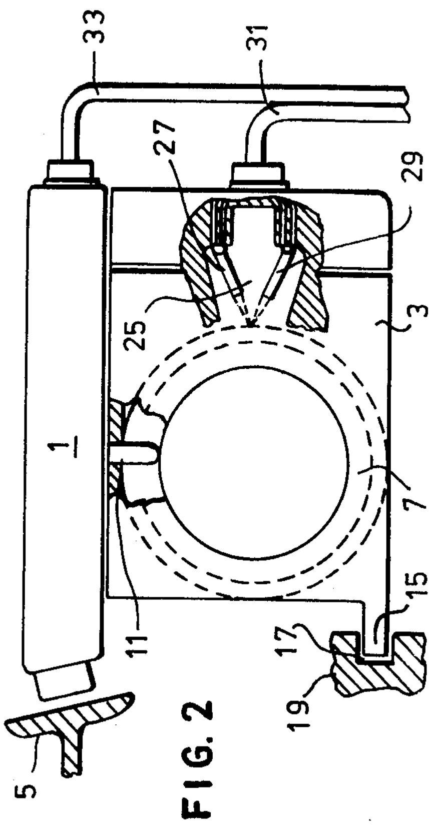
FIG. 2 is a partially broken-away cross-section through a printhead carriage of the printer shown in FIG. 1.

FIG. 1 shows a wire matrix print head 1 mounted on a laterally movable carriage 3 which is driven parallel to a platen 5 by means of a lead screw 7. The lead screw 7 is secured to the rotor of a reversible electric motor 9. It is important to prevent axial movement of the lead screw 7 relative to the platen 5. This can be achieved by employing a motor 9 having its rotor mounted in ball races and securing the lead screw 7 fast to the rotor of the motor 9. As shown in FIG. 2, the printhead carriage 3 contains a follower pin 11 which engages the thread 13 of the lead screw 7.

Figure 3:
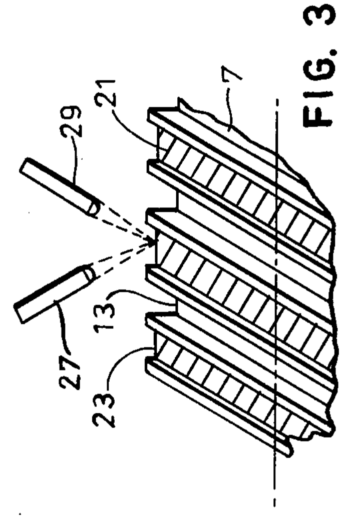
FIG. 3 is a schematic representation of a transducer in the printhead carriage sensing an emitter marking pattern on the lead screw.

The printhead carriage 3 is provided with a guidebar 15 which slides along a slot 17 formed in a frame member 19. An emitter marking pattern 21 is provided on a length of the periphery of the lead screw 7 and is formed in a shallow grooved track 23 formed in the surface of the lead screw 7 parallel to the thread 13. The marking of pattern 21 can correspond to individual print positions with which the printhead can be aligned. Pattern 21 is printed on a strip or tape of paper or plastic which is cemented in the track 23. Preferably the markings of pattern 21 are disposed normal to the sidewalls of the track 23. A phototransducer 25 mounted in the carriage 3 comprises a light emitting diode 27 and a phototransistor 29 which are aligned with the track 23. As indicated schematically in FIG. 3, the light from diode 27 is reflected from the space between the markings of pattern 21. The phototransducer 27 thus provides electrical output signal pulses which indicate the print positions of the printhead 1 along the platen 5. These electrical output signal pulses are passed over a conductor in a cable 31 to an electronic control apparatus 32 to indicate displacement increments for operating the print head 1. Electrical print signals from the electronic control apparatus 32 are supplied to the printhead 1 through a cable 33.

In operation of the printer, the motor 9 is energized to cause continuous rotation of the lead screw 7 to move the carriage 3 and printhead 1 from a position opposite one end of the platen 5 to a position opposite the other end of the platen. As successive print positions of the printhead are indicated by sensing the pattern 21, the print wires in the printhead are energized so that printing occurs "on-the-fly". On reaching the other end of the platen, the motor 9 is reversed and the next line printed in the reverse direction to that of the first line. Besides indicating the print position of the printhead 1 to control printing operations, sensing of the pattern 21 by the phototransducer 27 can be used to directly control the operation of the motor 9. For example non-uniformly spaced pattern markings such as 36 at the ends of the lead screw can control start-up, acceleration, running, deceleration and reversal of the motor 9. The end of the print line can be directly sensed by detecting the absence 35 of markings beyond the end of the pattern 21.

Instead of being printed on a strip of paper or plastic cemented in the shallow groove 23, the markings may be etched in the base of the lead screw thread 13. As an alternative to an optical coding system, the lead screw could be provided with a magnetic coding for co-operation with a magnetic or magneto-resistive transducer mounted in the carriage.

Having thus described my invention, what I claim as new and desire to secure by Letters Patent is:

1. A position tracking emitter comprising a carriage, a lead screw having a helical thread, said lead screw being supported for rotary movement, a lead screw follower mounted in said carriage and engaging said thread of said lead screw, whereby said carriage is driven along a linear path by said lead screw, an emitter marking pattern provided on said lead screw and extending along said thread, and transducer means mounted in said carriage for sensing said emitter marking pattern to produce electrical signals indicative of incremental displacement of said carriage along said linear path.

2. A position tracking emitter according to claim 1, wherein said marking pattern comprises stripes disposed on a contrasting background, and said transducer means comprises an opto-electrical transducer for sensing light reflected from said stripes.

3. A position tracking emitter according to claim 2, wherein said lead screw is provided with a shallow groove running parallel to said thread and said emitter marking pattern is formed on a tape secured in said shallow groove.

4. A position tracking emitter according to claim 1, wherein the space between adjacent marks in said emitter marking pattern varies along said track.

5. A position tracking emitter according to claim 1 in combination with a machine comprising control means responsive to said signals indicative of incremental displacement.

6. A position tracking emitter according to claim 5, comprising a motor providing continuous rotation of said lead screw.

7. A position tracking emitter according to claim 5, wherein said motor provides continuous rotation of said lead screw selectively in a clockwise and an anticlockwise direction.

8. A position tracking emitter according to claim 5, wherein said machine is a printer and a printhead is supported by said carriage.

9. A position tracking emitter according to claim 7, wherein said machine is a printer and a printhead is supported by said carriage.

* * * * *